(12) United States Patent
Englander

(10) Patent No.: US 7,290,891 B2
(45) Date of Patent: Nov. 6, 2007

(54) DUAL MIRROR MOUNTING ASSEMBLY

(76) Inventor: Benjamin Englander, c/o Rosco Inc., 144-31 91st Ave., Jamaica, NY (US) 11435

( * ) Notice: Subject to any disclaimer, the term of this patent is extended or adjusted under 35 U.S.C. 154(b) by 0 days.

(21) Appl. No.: 11/784,402

(22) Filed: Apr. 6, 2007

(65) Prior Publication Data

US 2007/0188899 A1    Aug. 16, 2007

Related U.S. Application Data

(60) Division of application No. 11/362,637, filed on Feb. 27, 2006, which is a continuation-in-part of application No. 10/737,238, filed on Dec. 15, 2003, now Pat. No. 7,055,973.

(51) Int. Cl.
G02B 7/182     (2006.01)
B60R 1/06      (2006.01)

(52) U.S. Cl. ................ 359/841; 359/872; 359/881; 248/479; 248/480

(58) Field of Classification Search ............ 359/841, 359/871, 872, 881, 855, 864, 865; 248/475.1, 248/476, 479, 480, 484, 486
See application file for complete search history.

(56) References Cited

U.S. PATENT DOCUMENTS

| 3,081,057 A | * | 3/1963 | Farnsworth | 248/484 |
| 3,142,469 A | * | 7/1964 | Clemmer | 248/487 |
| 3,168,277 A | * | 2/1965 | Stewart | 248/479 |
| 3,259,349 A | * | 7/1966 | Lee | 248/480 |
| 3,260,490 A | * | 7/1966 | Trautner | 248/480 |
| 3,395,883 A | | 12/1966 | Murgas | |
| 3,372,897 A | * | 3/1968 | Lee | 248/480 |
| 3,415,481 A | * | 12/1968 | Greenfield | 248/486 |
| 3,420,490 A | * | 1/1969 | Malachowski | 248/486 |
| 3,424,424 A | * | 1/1969 | Kelley | 248/486 |
| 3,482,811 A | * | 12/1969 | Zent | 248/480 |
| 3,501,122 A | * | 3/1970 | Barker | 248/486 |
| 3,608,856 A | * | 9/1971 | Hurley | 248/480 |
| 4,158,451 A | * | 6/1979 | Lukey | 248/479 |
| 4,368,868 A | * | 1/1983 | Urban | 248/549 |
| 4,441,682 A | * | 4/1984 | Su | 248/475.1 |
| 4,500,063 A | | 2/1985 | Schmidt et al. | |
| 4,512,634 A | | 4/1985 | Stout | |
| 5,106,049 A | | 4/1992 | Schmidt et al. | |
| 5,316,257 A | | 5/1994 | Schmidt et al. | |
| 6,361,178 B1 | * | 3/2002 | Lang et al. | 359/872 |

(Continued)

Primary Examiner—Ricky D. Shafer
(74) Attorney, Agent, or Firm—Ostrolenk, Faber, Gerb & Soffen, LLP

(57) ABSTRACT

A mirror mounting assembly for mounting a mirror on a vehicle bulkhead. The assembly includes a generally Z-shaped mirror mounting bracket configured for attachment to a structural portion of the vehicle inside an engine bay of the vehicle, and a support member connected to the mounting bracket. The mounting bracket includes a first flange and a second flange extending laterally in opposite directions from opposed edges of a connecting web. The first flange has two through-holes sized and positioned for connection to the structural portion inside engine bay by existing body panel mounting screws. The second flange and the connecting web are sized and configured so that the second flange extends out of the engine bay upon installation of the bracket. The support member carries a pivot element sized and configured to pivotally support a first support arm assembly for a rear view mirror unit and a second support arm assembly for a cross view mirror unit.

2 Claims, 7 Drawing Sheets

U.S. PATENT DOCUMENTS 6,398,375 B1 6/2002 Englander
6,883,923 B2 * 4/2005 Englander .................. 359/879
6,962,420 B2 * 11/2005 Branham .................. 359/841
7,055,973 B2 * 6/2006 Englander .................. 359/841
7,210,800 B2 * 5/2007 Englander .................. 359/841

* cited by examiner

FIG. 4
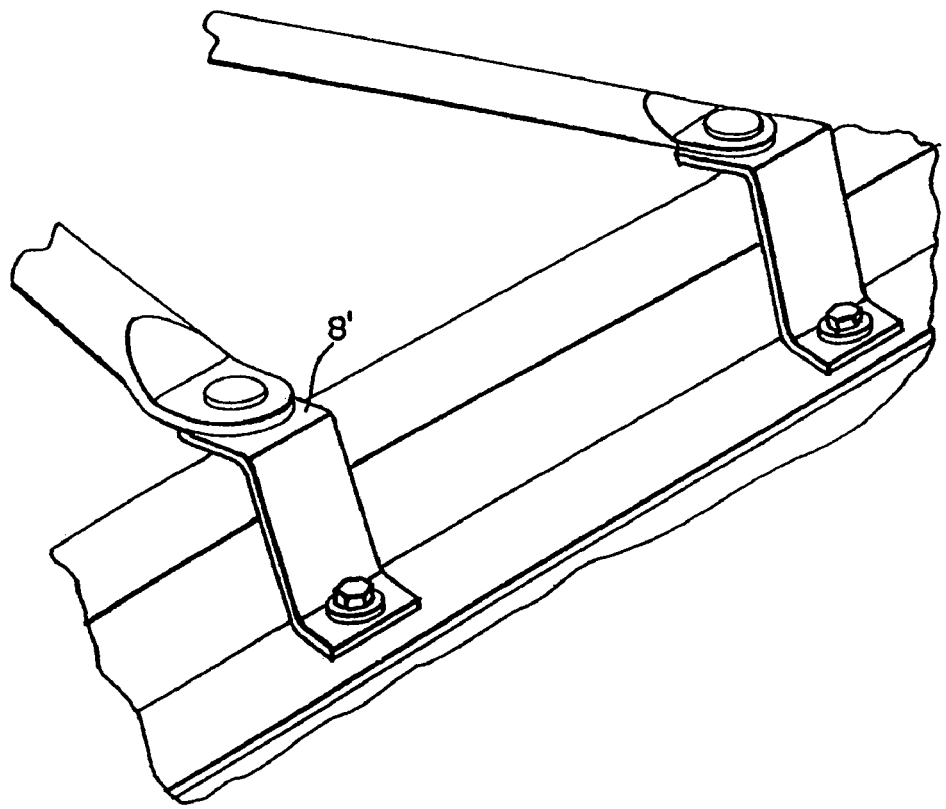
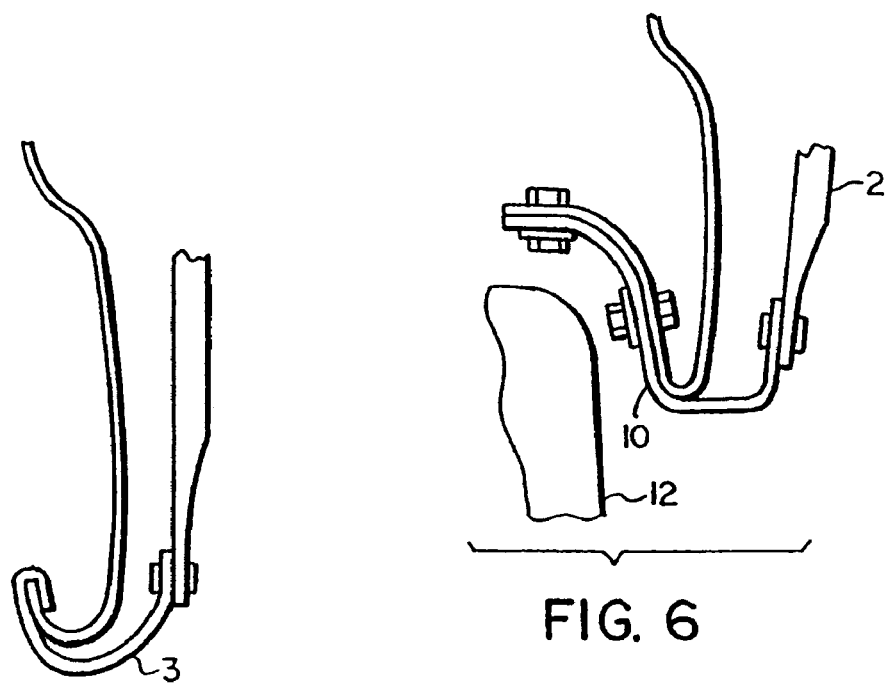
FIG. 5
FIG. 6

FIG. 7
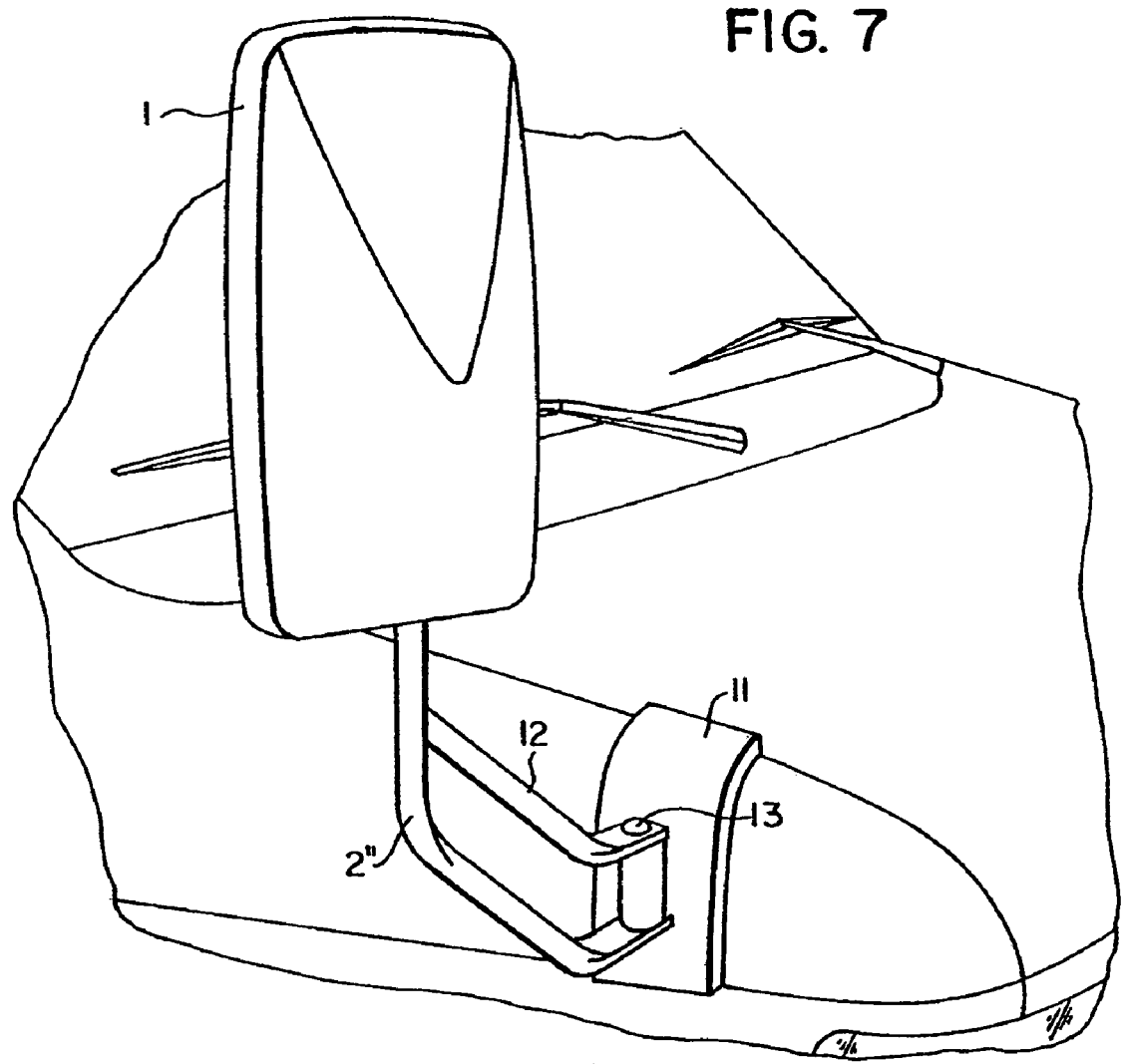
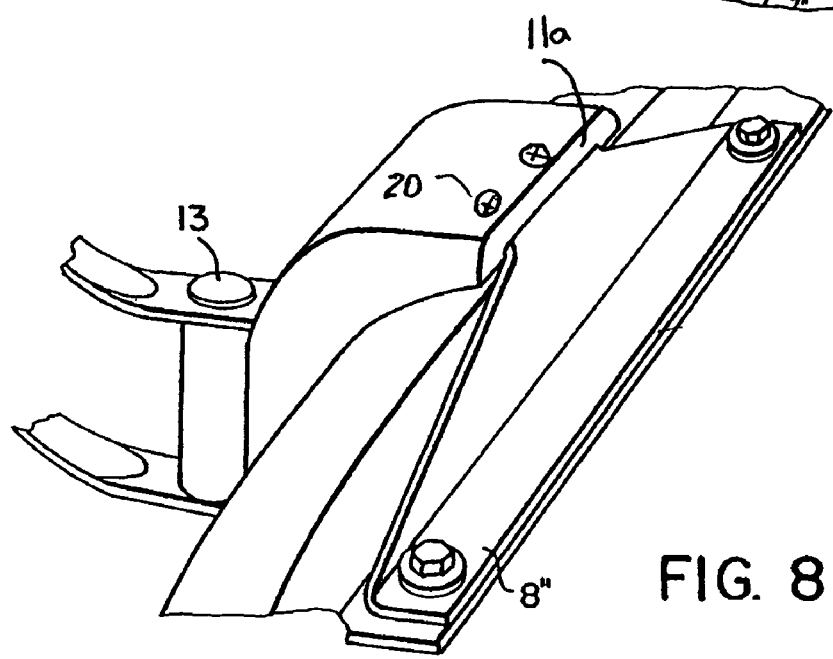
FIG. 8

DUAL MIRROR MOUNTING ASSEMBLY

CROSS-REFERENCE TO RELATED APPLICATION

This application is a divisional of U.S. application Ser. No. 11/362,637, filed Feb. 27, 2006 in the name of Benjamin Englander and entitled DUAL MIRROR MOUNTING ASSEMBLY, which is a continuation-in-part of U.S. application Ser. No. 10/737,238, filed on Dec. 15, 2003 now U.S. Pat. No. 7,055,973, entitled MIRROR MOUNTING ASSEMBLY, the contents of which are incorporated herein by reference.

BACKGROUND OF THE INVENTION

1. Field of the Invention

The present invention relates to a mounting assembly for mounting a mirror to a motor vehicle, and more particularly, in one aspect, to a low-vibration mounting assembly for both a rear view and a separate cross-view mirror.

2. Description of the Prior Art

Side view mirrors which are used on buses and trucks are well known in the art as evidenced by U.S. Pat. Nos. 3,395,883, 4,368,868, 4,500,063, 4,512,634, 5,106,049 and 5,316,257, the contents of which are incorporated by reference herein.

Particularly in the case of school busses, it is desirable for mirrors to be mounted so that the driver can see both in front of the vehicle, as well as toward the rear of the vehicle. This enables the driver to see and avoid injuring children passing in front of, or otherwise located in front of, the bus. Mirrors which provide such a front view, usually referred to as cross view mirrors, typically include elliptical convex reflective surfaces, and are typically disposed forward of a front-most portion of a bus. Mirrors which enable the driver to see to the rear, along the sides of the vehicle are known as side view mirrors, or sometimes as rear view mirrors.

Separate side view and cross view mirror assemblies can be provided, or, as in assignee's U.S. Pat. No. 6,398,375, can be provided in a single assembly. There are known advantages and disadvantages to both approaches. For example, in the case of the combined structure, the mirror assembly must be mounted as far forward on the vehicle as possible, as well as laterally projecting from the vehicle. This type of mounting of course requires elongated mounting arms which are often prone to vibration. Furthermore, in the prior art mirrors, the mounting arms are generally fixed to the body panels of the vehicle which also vibrate during operation of the vehicle and thus leads to an even greater vibration of the mirror.

Providing separate side view and cross view mirrors allows the rear view mirror assembly to be mounted more rearwardly using shorter arms and thus alleviates the vibration problem for the side view mirror to some degree. However, the second mounting assembly for the cross view mirror can still be subject to vibration for the reasons stated above. Also, two separate mounting assemblies are required.

The mirror mounting assembly are generally screwed or bolted to the vehicle body through holes in the body panels. These holes, especially those made in the fender of the vehicle in the vicinity of the wheel well, expose the bare metal of the body panel to moisture which leads to rust and corrosion developing in the area of the mounting hole. Due to the relatively thin metal used in constructing motor vehicles, in a very short period of time the area around the mounting hole becomes rusted and is no longer structurally sound and thus is no longer able to adequately hold the mounting assembly. This results in having to either repair the body panel and remount the mounting assembly or move the mounting assembly to another location which entails drilling new holes in the body panel. This in turn leaves the body panel in the area of the previously-drilled holes to further deteriorate.

Detachable mirrors are also known, as evidenced by U.S. Pat. No. 3,395,883. This mounting utilizes a clamp that engages around the lip of the wheel well of the vehicle and feet that contact the inner face of the fender edge forming the engine compartment. The feet are held in place by tension generated by a rubber element that extends between the feet at the engine compartment and the clamp at the wheel well. The problem with this type of device is that it is easily removed and is thus subject to theft. Furthermore, since the mounting arms are mounted to the body panel there is also the problem of vibrations being amplified by the mounting arms.

Thus, there is clearly still a need for amounting assembly, particularly for separately mounted rear and cross view mirrors, which alleviates the vibration and mounting problems associated with the prior art devices.

SUMMARY OF THE INVENTION

Accordingly, it is an object of the present invention to provide an improved mounting assembly wherein a single mirror mount assembly is particularly useful for mounting thereon and firmly holding both the rear and cross view mirrors which alleviates the vibration and mounting problems associated with the prior art devices.

Pursuant to this object and others which will become apparent hereafter, one implementation of the present invention provides a mirror mounting bracket in which the mounting bracket has at least two arms that are mounted directly to the vehicle bulkhead. This mounting of the bracket arms to the bulkhead avoids the vibrations created in the body panel. The mounting bracket also does not require any holes to be drilled in the exterior of the body panel. These two arms of the bracket are configured at one end to be mountable at the engine bay at, preferably, the same points at which the fender is fastened to the vehicle bulkhead or frame.

According to another aspect of the invention, there is provided a single mounting assembly to which the support arms for both a rear view and a separate cross view mirror can be attached, or which can be used to support a combined rear view and cross view mirror assembly. The mounting assembly includes a single mounting plate which is screwed or bolted to the engine compartment bulkhead or frame using the same mounting points used to secure the fender to the frame. The mounting plate may be substantially Z-shaped, and formed of a central connecting web portion and first and second legs or flanges extending laterally in opposite directions from opposite ends of the central portion. The first flange is designed to be mounted to the bulkhead, and is long enough to extend over two existing mounting holes of the bulkhead, used, for example, to secure a fender or similar body part. The second flange is substantially shorter. The connecting central web portion has a width that decreases from the wide leg to the narrow leg. When installed, the narrow second leg of the bracket extends from the engine compartment, and is attached to an external support member for pivotally supporting mounting arms for the two mirror assemblies. The external support member is substantially in the shape of an inverted L and is shaped to follow the contour of the vehicle fender so that it rests against the fender or other adjacent body panel. To avoid scratching the vehicle fender, a padding material may be provided between the support member and the fender.

A vertical pivot pin attached to the support member provides a common mounting point for the rear view and cross view mirror mounting arms, but can also serve as the mounting point for an arm assembly for a combined cross view and rear view mirror unit.

In either case, the pivot pin is anchored to the vehicle frame, and not to the sheet metal vehicle body, so the mirrors are less subject to vibration than in conventional installations. Also, the mounting bracket can be located such that the mirror arms can be shorter than in conventional installations, and do not have to project outwardly as far as in such installations, the are less prone to vibration for these reasons as well.

For a more complete understanding of the vehicle mounting assembly of the present invention, reference is made to the following detailed description and accompanying drawings in which the presently preferred embodiments of the invention are illustrated by way of example. That the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 4 shows the embodiment of FIG. 2 fastened to the engine bay bulkhead;

FIG. 5 shows a clip mounted to the wheel well lip;

FIG. 6 shows a bracket mounted in the wheel well;

FIG. 7 shows a third embodiment of the mirror mounting assembly used to support a combined rear view and cross view mirror assembly;

FIG. 8 shows the embodiment of FIG. 7 mounted to the engine bay bulkhead;

DETAILED DESCRIPTION OF THE INVENTION

Figure 1:
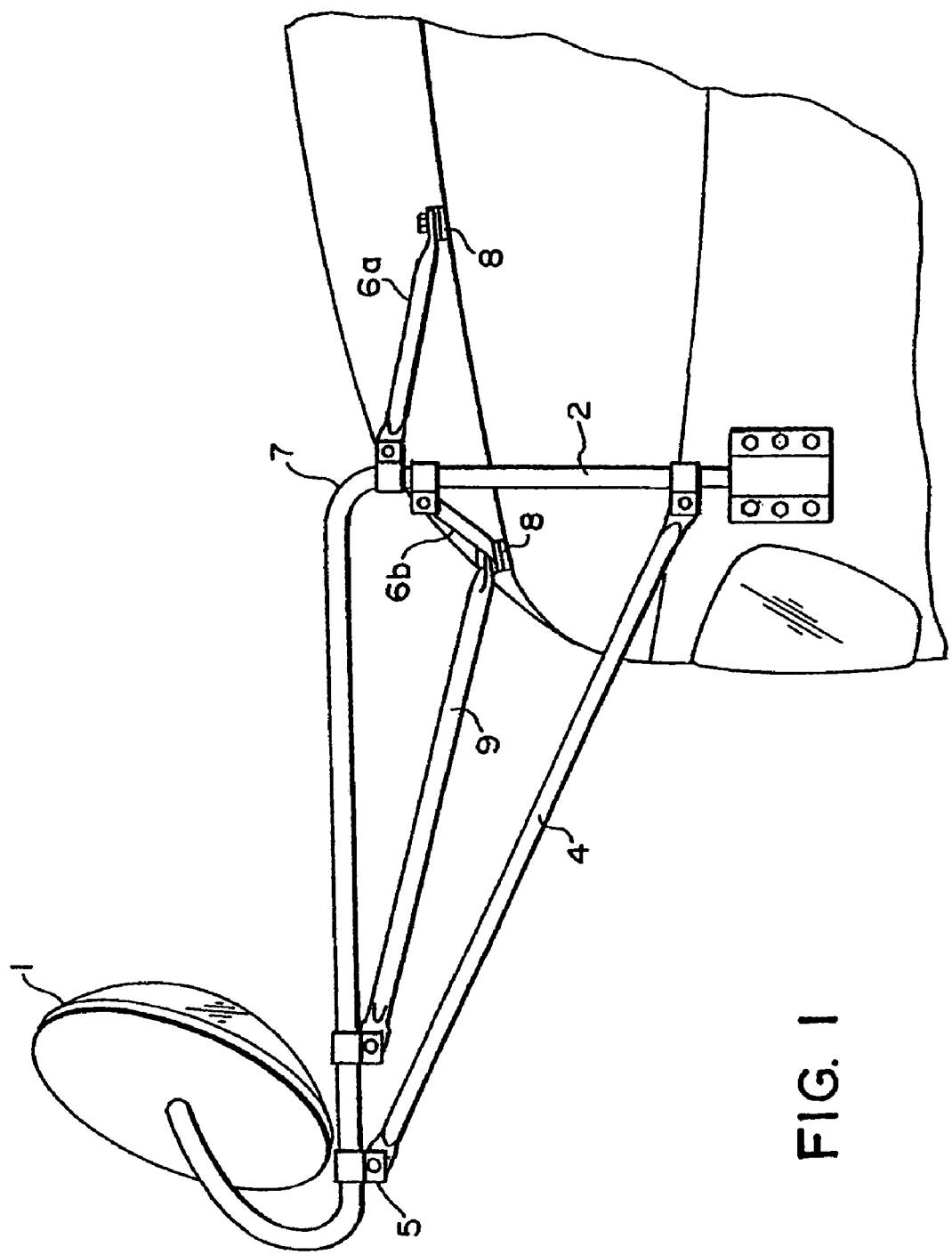
FIG. 1 is a perspective view of a first embodiment of the mirror mounting assembly of the present invention.
Figure 2:
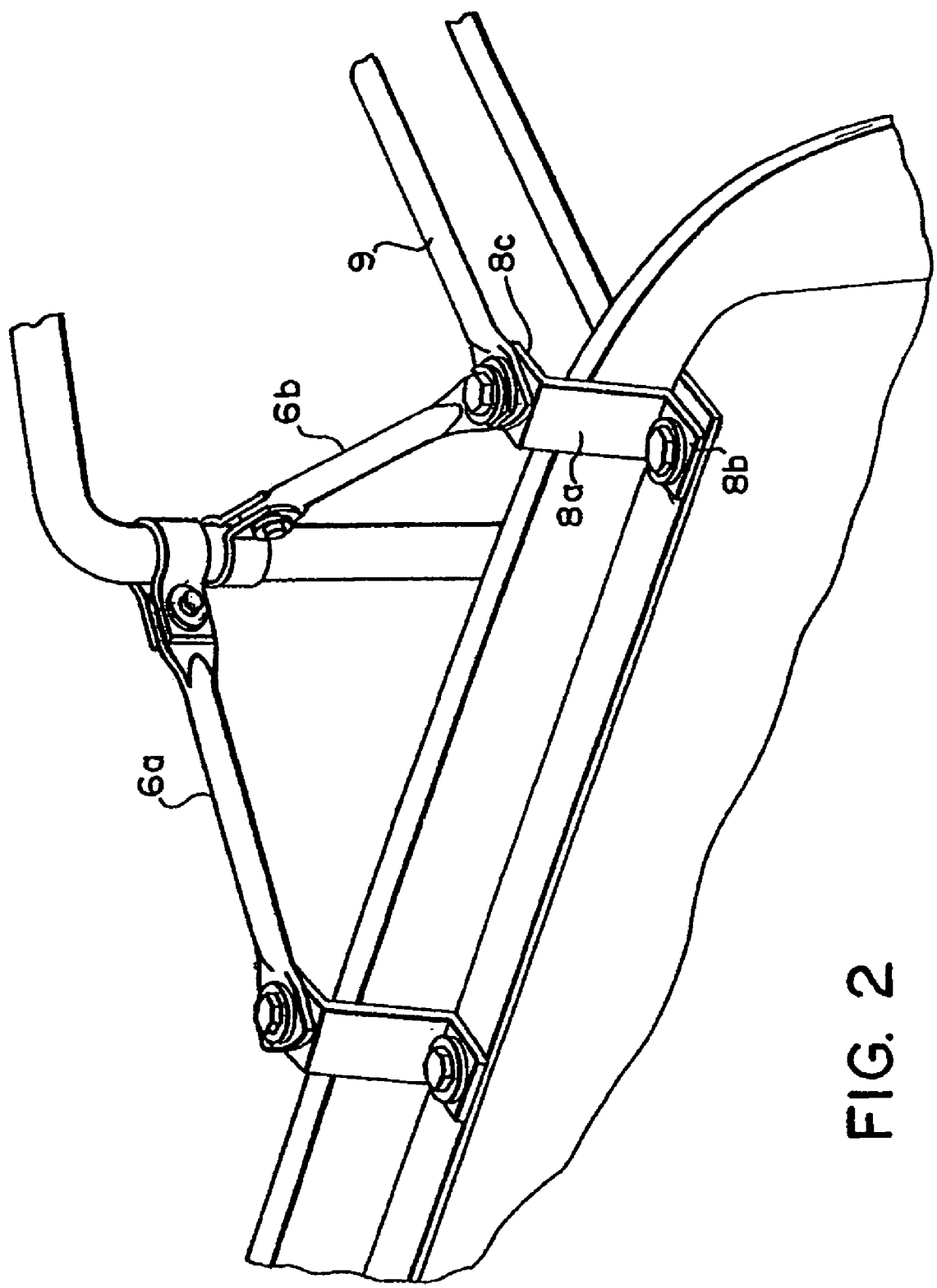
FIG. 2 is a view showing the fastening of the embodiment of FIG. 1 to the engine bay bulkhead.

As can be seen in FIG. 1, a first embodiment of the inventive mirror mounting assembly has a mirror element 1 mounted to one end of a main support member 2. In this embodiment, the main support member 2 has a substantially L-shape. The mirror 1 is attached to the free end of the long leg of the L-shaped support member 2. The end of the short leg of the support member 2 is attachable to the vehicle. This end of the support member 2 can be attached either directly to the vehicle panel as shown in FIG. 1, or can be clipped around the edge of the wheel well by a bracket or clip 3 attached to the end of the support member 2 (see FIG. 5). A support arm 4 extends between the free end of the long leg of the L-shaped support member 2 and the end of the short leg of the L-shaped support member 2. The support arm 4 can be attached to the support member 2 in any one of a variety of ways, including clamping 5 or welding. Two additional support arms 6a, 6b extend from the short leg of the L-shaped support member in a region of the angled portion 7 of the support member 2 connecting the legs. The additional support arms 6a, 6b have a first end that is connected to the support member 2 by, for example, clamps. The second end of the support arms 6a, 6b is attached to a bracket 8 that is configured to be mounted to the bulkhead or frame of the vehicle in the vicinity of the engine compartment. This mounting can be better seen in FIG. 2.

The brackets 8 are folded members having a central portion 8a and two end flanges 8b, 8c which extend laterally from the central portion 8a in opposite directions. The end flange 8b is connectable to the bulkhead or frame, preferably by the same bolt which mounts the fender body panel to the frame. The angle between the flange 8b and the main portion 8a of the bracket is such that the main portion 8a follows the surface of the fender forming the perimeter of the engine compartment. The central portion 8a of the bracket has a thickness so as to permit the vehicle hood to open and close without interference. The other flange 8c of the bracket provides a mounting point for the support arm 6a, 6b.

In order to further stabilize the mirror, a further support arm 9 has one end connected to the bracket 8a on which the support arm 6b is mounted. The other end of the support arm 9 is connected to the end of the long leg of the L-shaped support member 2.

The unique construction of the brackets and support arms allows the mounting assembly to be fixed to the bulkhead of the vehicle thereby reducing vibration of the mirror.

The end of the short leg of the support member 2 can be mounted to the body panel of the vehicle by a conventional bracket as shown in FIG. 1. FIG. 5 illustrates the clip 3 which permits the support member 2 to be mounted to the wheel well thereby avoiding the necessity for drilling holes in the exterior of the body side panel. An alternative mounting is shown in FIG. 6. In this embodiment, a bracket 10 is mounted to the inside of the wheel well and preferably is connected through the wheel well to the bulkhead. The bracket 10 follows the contour of the wheel well so as to avoid interference with the wheel 12 of the vehicle and projects from the wheel well to a position where it is connected to the support member 2.

This embodiment completely avoids the necessity of drilling holes in the exterior body panel and therefore avoids the problems encountered and presented by such holes.

The end of the support member 2 to which the mirror element 1 is mounted is curved upwardly and has a through hole for mounting the mirror element 1 in a conventional manner which allows pivoting of the mirror element 1.

Figure 3:
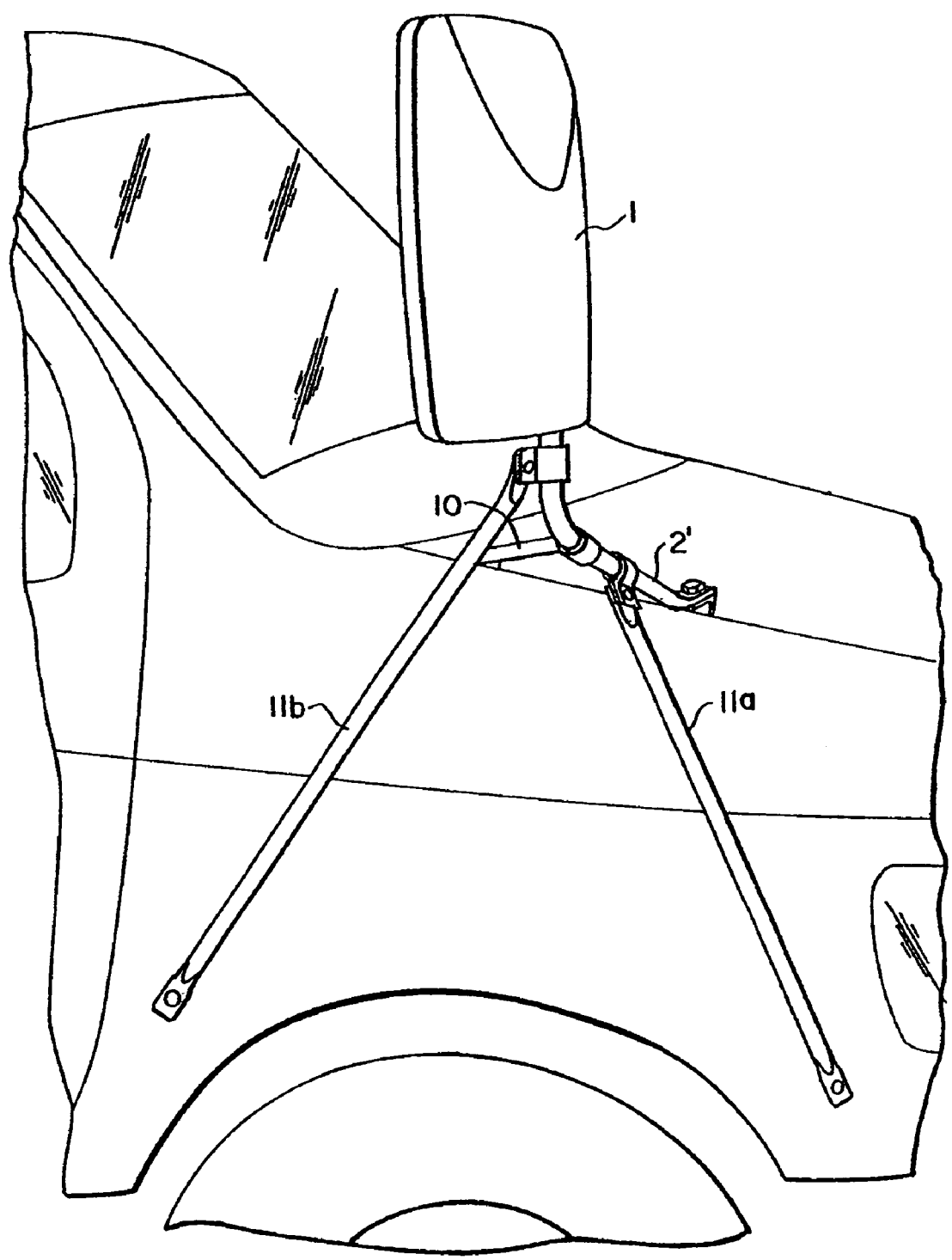
FIG. 3 shows a second embodiment of the mirror mounting assembly of the invention.

FIG. 3 shows an alternative embodiment of the invention in which the mirror element 1 is mounted to one end of a main support member 2'. The main support member 2' is bent at an angle so as to form two legs. The mirror element 1 is mounted to one of the legs while the other of the legs is mounted at its free end to a bracket 8' which is connectable to the bulkhead of the vehicle in the engine compartment as discussed above in connection with the embodiment of FIG. 1. A further support arm 10 extends between another bracket 8' connected to the bulkhead and a region of the main support member 2' near the bend therein.

A support arm 11a has one end connected to the main support member 2' at a position between the end of the support member 2' connected to the bracket 8' and the angled region of the support member 2'. The second end of the support arm 11a is connectable to the vehicle in a manner similar to the short leg of the support member 2 discussed above in connection with the embodiment of FIG. 1. In other words, the second end of the support arm can be attached either by a conventional bracket or by the brackets as shown in FIGS. 5 and 6. Yet another support arm 11b has one end attached to the support member 2' adjacent the mirror element 1, and another end that is attachable to the vehicle in a manner similar to the support arm 11a.

FIG. 4 shows the mounting brackets 8'. In this embodiment, the flanges of the bracket are not at a 90° angle to the main portion of the bracket. The angle is selected so as to correspond to the side wall of the engine compartment opening so as to permit opening and closing of the vehicle hood.

FIG. 7 shows another embodiment of the invention in which the mirror element 1 is mounted to one end of a main support member 2". The main support member 2" is bent at an angle so as to form two legs. The mirror element 1 is mounted to one of the legs while the other of the legs is mounted at its free end to a support member 11. The support member 11 is configured on an inner side to substantially conform to the shape of the vehicle fender. Essentially, the support member 11 is L-shaped, with a short leg of the L resting on the top of the fender adjacent the engine compartment opening, and the longer leg extending downwardly along the fender of the vehicle. As shown in FIG. 8, the short leg of the support member 11 is attached to a mounting bracket 8" that differs from the brackets 8 and 8' in that the flange of the bracket 8" which is mounted to the bulkhead or frame is of a width sufficient to be connected to the bulkhead by two bolts. The other flange of the bracket 8" which projects laterally from the engine compartment is smaller than the flange mounted to the bulkhead. The web connecting the two flanges is tapered from one flange to the other. The support member 11 is anchored to the smaller flange of the bracket 8". This can be accomplished in a number of ways, including by screws 20 as illustrated in FIG. 8, or by gluing, snap fitting, or by integrally connecting with each other, etc. The wide dimension of the bracket flange mounted to the bulkhead provides stability for the mirror in the longitudinal direction of the vehicle. The main support member 2" is connected to the support member 11 by a pin 13 so that the mirror and the support member can pivot about a vertical axis. A further support arm 12 is connected between the pin 13 and the leg of the support member 2" to which the mirror is connected. The arm 12 provides lateral stability to the mirror. As shown in FIG. 7, the support member 11 has its upper distal end 11a positioned adjacent the location on the vehicle where the fender meets the hood, with the web of the bracket extending vertically in the space between the fender and the hood. The two flanges and the web can, however, be of the same size, which is similar to the width of the support member 11. The support member 11 is connected to the fender panel by screws in a conventional manner.

In order to prevent scratching of the fender, it is possible to provide a barrier member such as a rubber or fabric layer between the support member 11 and the vehicle fender. The barrier member can be mounted to the surface of the support member 11 facing the fender.

Figure 9:
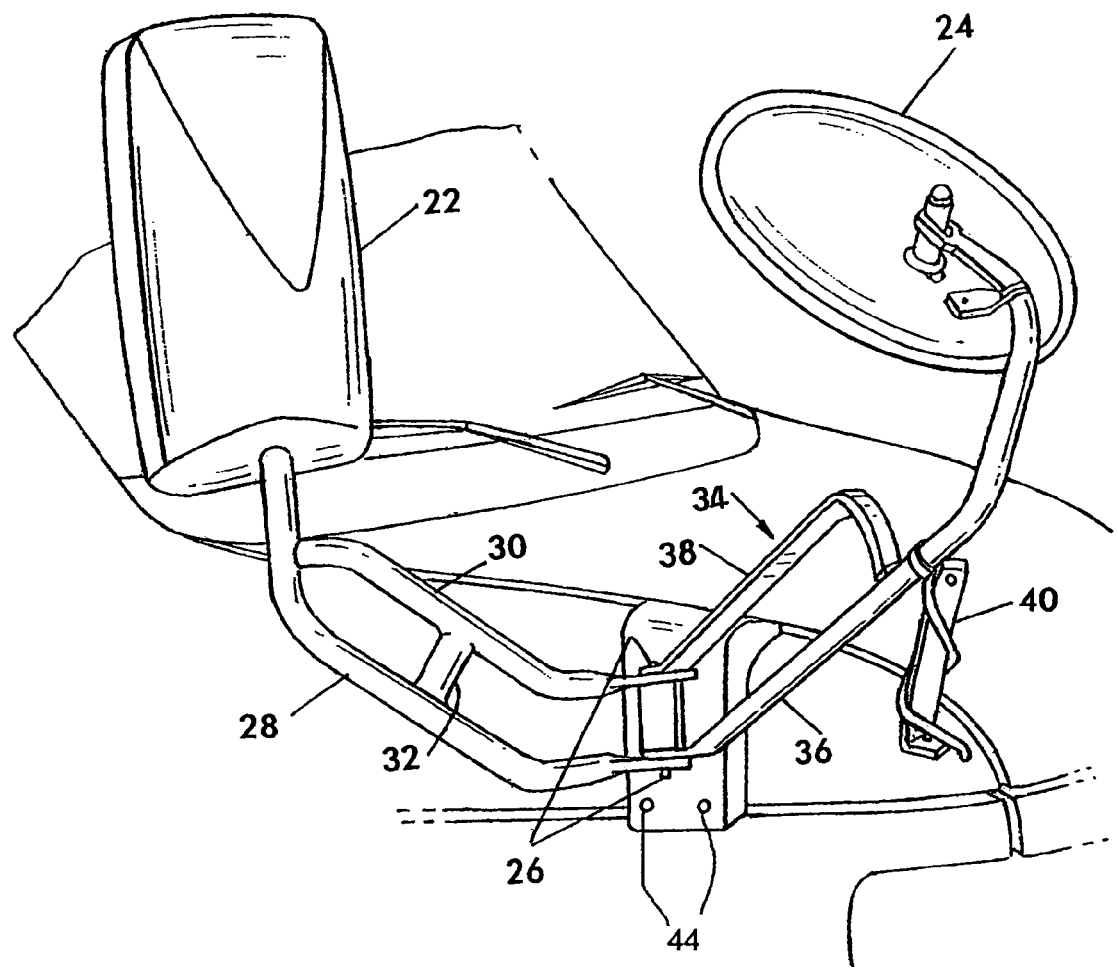
FIG. 9 shows a third embodiment of the mirror mounting assembly used to support separate rear view and cross view mirror assemblies as mounted on a vehicle.

FIG. 9 illustrates use of the mounting assembly of FIGS. 7 and 8 to separately mount a rear view mirror unit 22 and a cross view mirror unit 24 at a common pivot 26 which is essentially the same as pivot 13 in FIGS. 7 and 8. Here, the mounting arm for rear view mirror unit 22 may be the same as in FIG. 7, with a main support member 28, and a second support 30 which provides lateral stability. Additional rigidity can be provided by a connecting strut 32 between support members 28 and 30.

Figure 10:
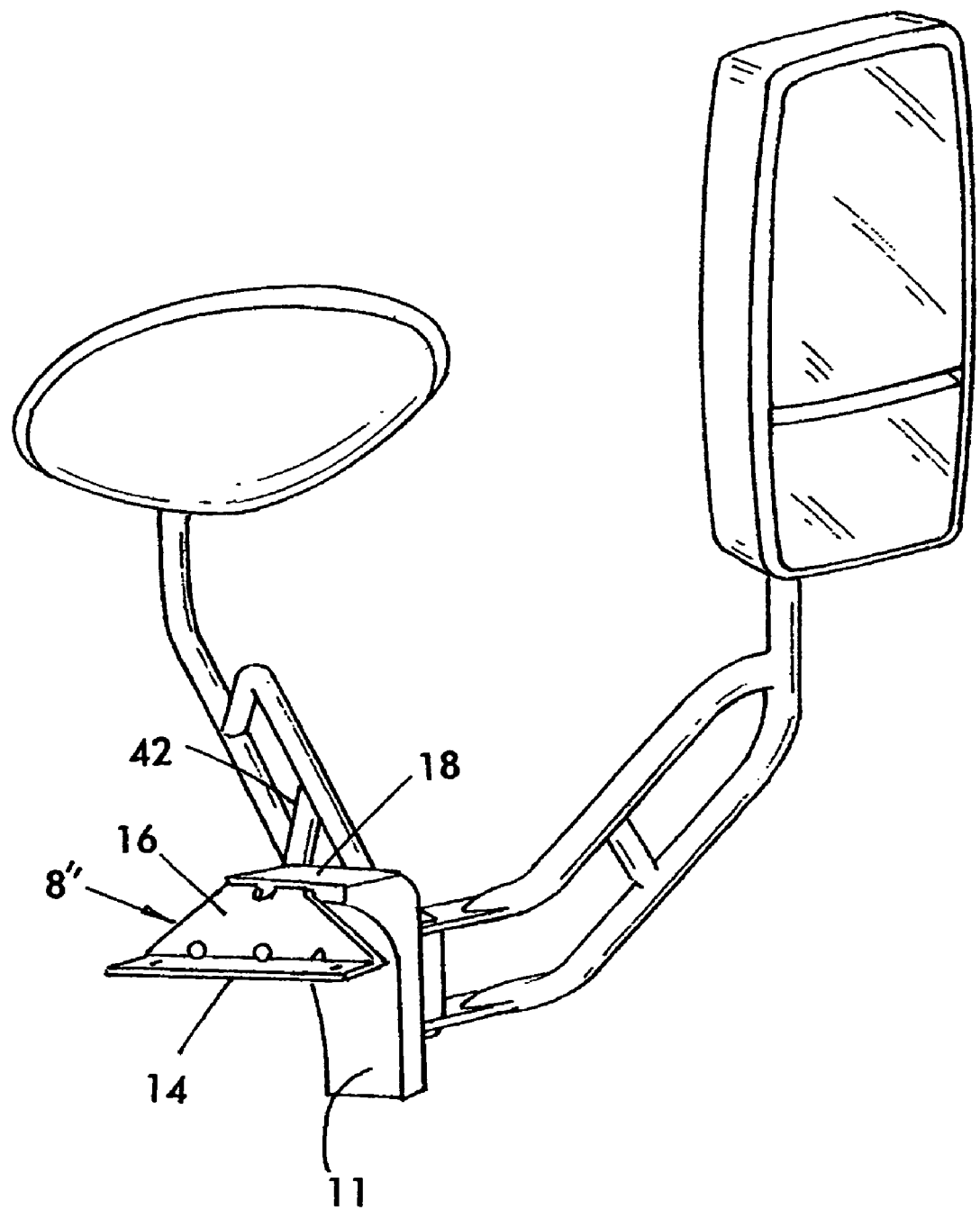
FIG. 10 shows the embodiment of FIG. 9 off the vehicle.

The support assembly 34 for cross view mirror unit 24 includes a main support arm 36 and a second stabilizing arm 38 respectively attached to the lower and upper ends of pivot pin 26. Additional stability can be provided by a further support member 40 connecting the outer end of main support 36 to the body of the bus, and/or by a connecting strut 42 as illustrated in FIG. 10. To provide additional rigidity, the lower end of support member 11 can be secured to the fender panel, as by screws 44 (FIG. 9). In FIG. 10, note the support-11, the web 16, the flange 14 and the upper portion 18 of the L-shaped support 11.

While the mirror mounting assembly has been described in conjunction with specific embodiments, it is evident that many alternatives, modifications and variations will be apparent to those skilled in the art in light of the disclosure herein. It is intended that the meets and bounds of the invention be determined by the appended claims rather than by the language of the above specification, and that all such alternatives, modifications and variations which form a function or co-jointly or cooperative equivalent are intended to be included within he spirit and scope of these claims.

What is claimed is:

1. A mirror mounting assembly for mounting a mirror to a vehicle, comprising:

a support member substantially in a shape of an inverted L, having a short leg and a long leg, an exterior side and an interior side;

an arm assembly configured to support at one end thereof a mirror unit and having an arm assembly connecting end;

a pivot element located and formed integrally on the long leg of the support member and designed to pivotally and rotationally support the arm assembly connecting end, the interior side of the support member being shaped to complement the exterior surface of a fender portion of a vehicle located adjacent the hood portion of the vehicle;

a mirror mounting bracket configured for attachment to a structural portion of the vehicle below the hood of the vehicle and in a manner which is exteriorly invisible when the hood is closed, wherein the mounting bracket includes a first flange that has at least one through-hole sized and positioned for connection through the structural portion of the vehicle and a second flange sized and configured to be affixed to the short leg of the inverted L of the support member; and wherein the support member is supported and affixed to the vehicle by means of the mounting bracket and by means of screws which pass through the long leg of the support member and pass through the fender of the vehicle; and the arm assembly is supported in the pivot element integrally formed with the support member.

2. The mirror mounting assembly of claim 1, wherein the mirror unit comprises first and second mirror assemblies.

\* \* \* \* \*